United States Patent
Villa et al.

(10) Patent No.: US 10,831,080 B2
(45) Date of Patent: Nov. 10, 2020

(54) MODULATOR ASSEMBLY

(71) Applicant: Lumentum Technology UK Limited, Towcester (GB)

(72) Inventors: Marco Villa, Cabiate (IT); Luigi Gobbi, Milan (IT); Stefano Balsamo, Towcester Northamptonshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 16/456,721

(22) Filed: Jun. 28, 2019

(65) Prior Publication Data
US 2020/0064706 A1 Feb. 27, 2020

(30) Foreign Application Priority Data
Aug. 24, 2018 (GB) .................................. 1813855.2

(51) Int. Cl.
*G02F 1/225* (2006.01)
*G02F 1/035* (2006.01)
*G02B 6/12* (2006.01)
*G02F 1/21* (2006.01)
*G02F 1/01* (2006.01)

(52) U.S. Cl.
CPC ............ *G02F 1/2255* (2013.01); *G02F 1/011* (2013.01); *G02F 1/0356* (2013.01); *G02B 2006/1204* (2013.01); *G02B 2006/12061* (2013.01); *G02B 2006/12159* (2013.01); *G02F 2001/212* (2013.01)

(58) Field of Classification Search
CPC .............................. G02F 1/2255; G02F 1/011; G02B 2006/1204
See application file for complete search history.

(56) References Cited

U.S. PATENT DOCUMENTS

| | | | |
|---|---|---|---|
| 9,954,638 B2* | 4/2018 | Sugiyama | H04J 14/06 |
| 2005/0271313 A1* | 12/2005 | Oikawa | G02F 1/035 385/3 |
| 2013/0322809 A1* | 12/2013 | Goh | H04B 10/5161 385/3 |
| 2014/0185978 A1* | 7/2014 | Liao | G02F 1/00 385/3 |
| 2016/0370686 A1* | 12/2016 | Liao | G02F 1/00 |
| 2017/0033884 A1* | 2/2017 | Sugiyama | H04J 14/06 |
| 2019/0271896 A1* | 9/2019 | Sugiyama | G02F 1/2257 |
| 2019/0296830 A1* | 9/2019 | Kucharski | G02F 1/0121 |

* cited by examiner

*Primary Examiner* — Sung H Pak
(74) *Attorney, Agent, or Firm* — Harrity & Harrity, LLP

(57) ABSTRACT

An electro-optic modulator. The modulator is made as a plurality of discrete elements, and adjacent elements abut such that there are no free space optics between adjacent discrete elements. The modulator comprises a radio frequency, RF, element configured to modulate light passing through the element based on an electrical RF input. The plurality of discrete elements comprises a first set of discrete elements fabricated from thin film lithium niobate, TFLN, and a second set of discrete elements fabricated from silicon photonics, SiPh. The first set of discrete elements comprises the RF element.

20 Claims, 2 Drawing Sheets

US 10,831,080 B2

MODULATOR ASSEMBLY

RELATED APPLICATION

This application claims priority under 35 U.S.C. § 119 to United Kingdom Patent Application No. 1813855.2 filed on Aug. 24, 2018, the content of which is incorporated by reference herein in its entirety.

FIELD OF THE INVENTION

The present invention relates to the field of optical components. In particular, the invention relates to radio frequency, RF, modulators.

BACKGROUND

Thin-film lithium niobate (TFLN) is a promising technology for the fabrication of waveguide structures. TFLN comprises, in order, a substrate (often silicon (Si) or lithium niobate ($LiNO_3$)), an intermediate silica ($SiO_2$) layer, and a thin lithium niobate layer. The lithium niobate layer is typically up to 1200 nm, up to 800 nm, up to 600 nm, or up to 400 nm thick, and is substantially uniform in thickness across the device—aside from the waveguide, which is fabricated by rib or ridge etching of the lithium niobate film.

TFLN may be used to make very efficient RF modulation components—i.e. significantly more efficient than can be achieved by conventional lithium niobate constructions, or by other fabrications. Currently, much of the research on TFLN has been focused on this possibility for efficient modulation, with little development going into the other aspects of TFLN devices.

SUMMARY

According to a first aspect of the invention, there is provided an electro-optic modulator. The modulator is made as a plurality of discrete elements, and adjacent elements abut such that there are no free space optics between adjacent discrete elements. The modulator comprises a radio frequency, RF, element configured to modulate light passing through the element based on an electrical RF input. The plurality of discrete elements comprises a first set of discrete elements fabricated from thin film lithium niobate, TFLN, and a second set of discrete elements fabricated from silicon photonics, SiPh. The first set of discrete elements comprises the RF element.

According to a second aspect, there is provided a method of manufacturing a modulator. A first and second set of discrete elements are provided, wherein the first set of discrete elements are fabricated from thin film lithium niobate, TFLN, and the second set of discrete elements are fabricated from silicon photonics, SiPh. The first set comprises a radio frequency, RF, element configured to modulate light passing through the element based on RF electrical input. The discrete elements are joined such that there are no free space optics between adjacent discrete elements.

DETAILED DESCRIPTION

It has been found that, while TFLN is particularly suited to components with RF electrical inputs such as modulators, and can achieve extremely small curvature radii and sharp bends (compared to conventional lithium niobate or planar lightwave circuits), it experiences relatively poor performance in other aspects required in optical devices. For example:

The small mode diameter of TFLN (typically 1.2 microns×0.6 microns) causes it to not couple efficiently to standard optical fibres (whose mode field diameter is more than 10 um). On the other hand, this very high confinement of the optical mode is what allows for the small curvature radii and sharp bends to be used.

TFLN could in principle experience large DC drift, especially when used together with silica layers, thus requiring complex calibration for use in DC controlled devices.

TFLN structures cannot manage polarisation efficiently and easily (either filtering, modifying, or combining polarisations).

TFLN photodetectors are generally fabricated in a hybrid manner by coupling light inside a semiconductor photodiode placed close or directly on the optical waveguide, posing problems of costs, yield and must be placed with good alignment accuracy.

Figure 1A:
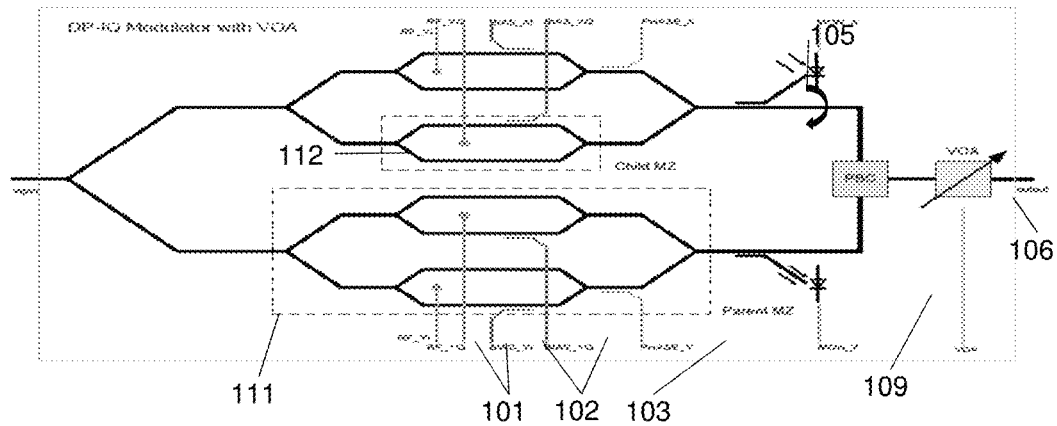
FIG. 1A is a schematic diagram of a PM-QPSK modulator.
Figure 1B:
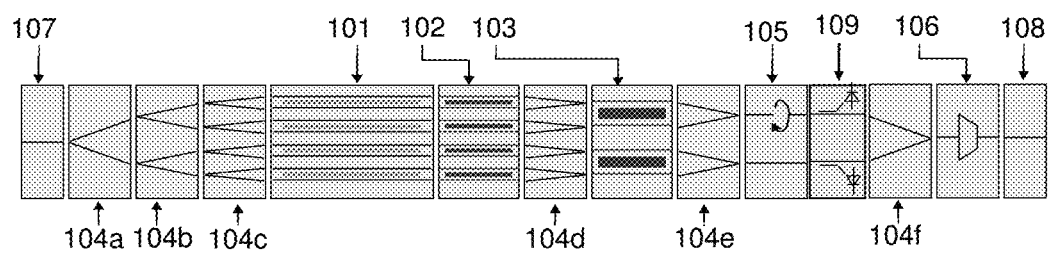
FIG. 1B is a diagram of the modulator of FIG. 1A divided into discrete elements.

As an example, consider the PM-QPSK (phase modulation-quadrature phase shift keying) modulator 100 of FIG. 1A and FIG. 1B. FIG. 1A shows the modulator schematically, and FIG. 1B shows the modulator divided into discrete elements.

The modulator comprises two "parent" Mach-Zehnder (MZ) interferometers 111, each of which comprises two child MZ interferometers 112. The output of one parent interferometer passes through a polarisation rotator 105, and the outputs of both parent interferometers are combined by a polarisation combiner 106.

The MZ interferometers are controlled by RF electrodes 101, and (DC) bias electrodes 102. The relative phase of the parent MZ electrodes is controlled by (DC) phase electrodes 103. The splitter array comprises several splitter elements 104a to 104f. A polarisation rotator element 105 comprises a polarisation rotation element, and a pass-through element, such that it takes two inputs and rotates the polarisation of one of them. Photodetectors 109 monitor the intensity of the output signal from each parent MZ. The polarisations are combined (after the splitter 104f) by a polarisation combiner 106. The system also comprises an input 107 and output 108 unit, which are configured to couple to optical fibre, or to other components of an optical system.

The discrete elements of FIG. 1B abut such that there are no free-space optics between the elements. This allows the creation of a modular modulator, giving considerably more design flexibility.

It will be noted that the modulator 100 comprises both elements for which TFLN is a particularly efficient technology (the RF electrodes 101), and elements for which TFLN is not the best choice of technology (the input 107, output 108, polarisation elements 105, 106, and DC elements 102, 103). In general, this will be true of any optical system—i.e. there will be elements which TFLN is suited for, and elements which it is not. There will also be elements (such as the splitters 104a-f) where the construction is not of any particular significance.

Another emerging technology for waveguide construction is silicon photonics (SiPh), also known as silicon planar lightwave circuits or silicon photonic integrated circuits. In this technology, silicon is used to make waveguides and other photonic elements by redepositing it on a lower index layer in a process known as "silicon on insulator". This presents an improvement over previous silica ($SiO_2$) based PLCs, as silicon has a much higher effective index of refraction than silica glass, and can therefore allow fabrication of much smaller devices.

SiPh devices are particularly efficient for polarisation management and detection of light. Techniques exist to allow efficient coupling of SiPh devices to optical fibres (e.g. by grating coupling (off-plane gratings can reach extremely high efficiencies, more than 80%), mode expanders (which allow the use of standard fibre "pigtail" with low loss as in conventional small contrast waveguides), or tapered waveguides with end fire coupling). SiPh elements have also been found to bond efficiently to TFLN elements, and this bonding can be further improved by the use of mode expanders, index matching materials, and anti-reflective coatings. This efficient bonding occurs in part because the typical mode dimensions of SiPh (0.8 microns×0.4 microns) are similar to the typical mode dimensions of TFLN (1.2 microns×0.6 microns). Further efficiency improvements can be obtained by properly choosing the waveguide cross-sections in the coupling region to ensure a good match.

The necessary matching of modes which yields a high coupling efficiency means creating a good spatial overlap of the intensity profiles.

Mathematically, the quality of mode matching can be quantified with an overlap integral. The following formula, involving the square of such an overlap integral, calculates the coupling efficiency concerning optical powers:

$$\eta = \frac{\left| \int E_1^* E_2 dA \right|^2}{\int |E_1|^2 dA \int |E_2|^2 dA}$$

where $E_1$ and $E_2$ are the complex electric fields in a plane, referring e.g. to the field of a mode of a first waveguide and the field of a mode of a second waveguide mode, where the integration spans the whole beam cross-section.

Intuitively, mode matching measures "how compatible" the modes are. Thus, if a waveguide is 10 times wider than another one the matching between their modes will be low, and in turn the coupling efficiency will be small (i.e., high coupling losses will appear).

In order to match the modes of different waveguides, a simple technique is a "mode expander", that is, a structure which increases the mode size adiabatically: the simplest type of mode expander is a tapered waveguide, but other structures, more complex and more powerful, have been studied and fabricated, such as 2D tapering, Periodically Segmented Waveguides (PSW), inverse tapers with evanescent coupling, etc. The mode expander is configured to provide good coupling between the waveguides by providing a close match to the TFLN mode size at the end coupled to the TFLN chip, and a close match to the SiPh waveguide at the end coupled to the SiPh chip. The mode expander may be built into either or both of the TFLN and SiPh chips.

In the specific case of TFLN and SiPh waveguides, since the modes are very similar in dimensions, an horizontal tapering (i.e. a waveguide having a taper in one dimension) is sufficient to optimize the overlap. The optimum tapering can be found with optical simulations.

Figure 4:
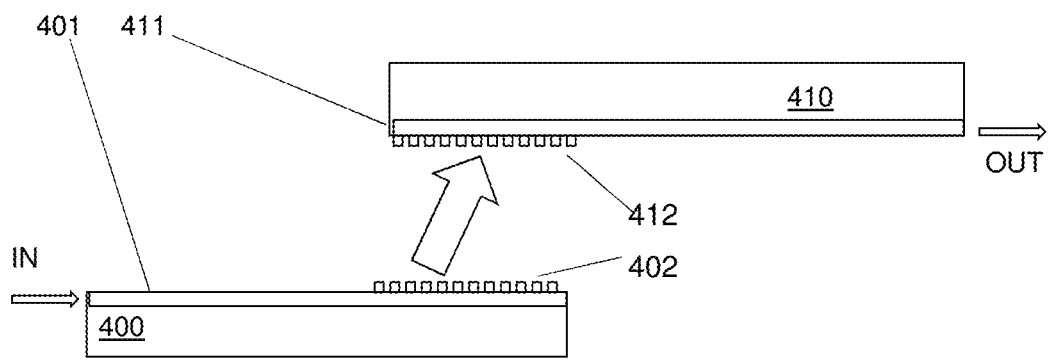
FIG. 4 is a schematic diagram of a grating coupling between a TFLN and a SiPh chip.

Another technique, more complex but quite tolerant in terms of misalignment, is grating-based coupling. FIG. 4 illustrates a grating coupling between a TFLN chip 400 and an SiPh chip 410. Each chip comprises a respective waveguide layer 401, 411, and a respective grating 402, 412 on the waveguide layer. The chips are shown separated for clarity. The basic idea is that a properly designed grating can deflect the light beam off-plane with respect to the optical waveguide: the light beam is collected by another grating on the SiPh surface which couples it into the silicon waveguide. This allows very efficient, free-space light coupling without any need for lenses and with greater lateral displacement tolerances since the grating regions are usually much larger than the input waveguide. This assembly method requires, as it is evident from FIG. 4, a flip-chip coupling of TFLN and SiPh. The same technique may be used to couple light in either direction between TFLN and SiPh chips, and to couple light out from a SiPh device into an optical fiber.

It is therefore advantageous to construct a modular modulator such that discrete elements containing RF components are constructed from TFLN, and at least one other discrete element is constructed from SiPh. In other words, the modulator comprises a first set of discrete elements formed from TFLN, comprising at least the RF element, and a second set of discrete elements formed from SiPh (comprising at least one element). This allows the advantages of TFLN for RF components to be realised, while mitigating the disadvantages of TFLN for other components.

Referring again to FIG. 1B (though noting that this is not a limiting example), the RF element 101 would be constructed from TFLN. Any of the following elements could be advantageously constructed from SiPh:

The bias element 102
The phase element 103
The polarisation rotation element 105
The polarisation combiner 106
The input 107
The output 108
The detector 109

There is no particular advantage to either construction for the splitters 104a-f, and as such they would generally be fabricated from the same material as either of the components which they are connected to, in order to reduce the number of SiPh to TFLN connections (which, while efficient, are still less efficient than TFLN to TFLN or SiPh to SiPh connections).

Figure 2:
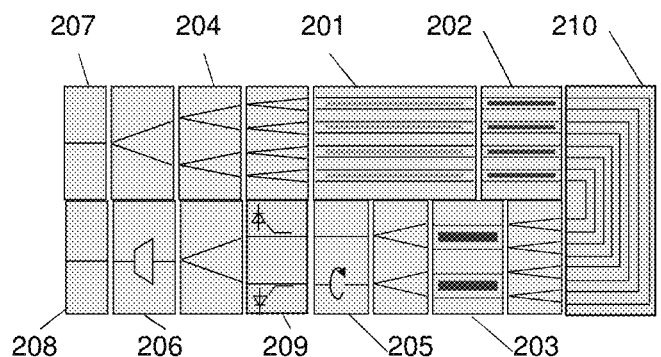
FIG. 2 is a schematic diagram of a folded modulator configuration.

FIG. 2 shows an exemplary "folded" configuration for a PM-QPSK modulator. The "folded" configuration comprises a splitter array 204, an RF element 201, a bias element 202, a phase element 203, a polarisation rotation element 205, a polarisation combiner 206, an input 207, an output 208, and a detector element 209, each of which is broadly equivalent to the matching component of FIG. 1B. In addition, the "folded" configuration comprises a U-turn element 210, which is configured to change the direction of the light beams by 180 degrees. The U-turn element may be advantageously made from SiPh, to take advantage of the small bending radius possible with SiPh elements but, as previously stated, TFLN also allows for small bending radii, so this element could be made from either material.

Figure 3:
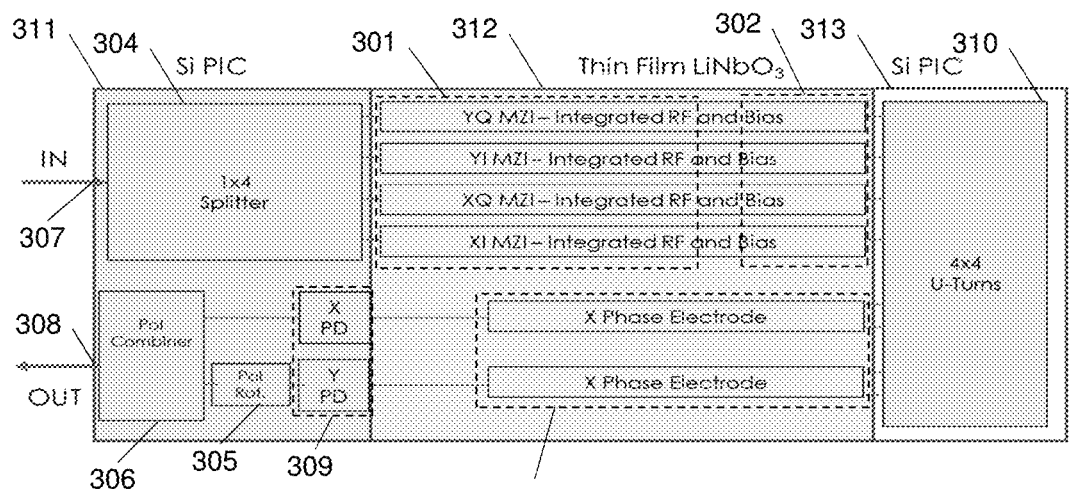
FIG. 3 is a schematic diagram of an alternative folded modulator configuration.

While FIGS. 1B and 2 show each discrete element as providing a single function, adjacent sections made from the same material may provided as a single discrete element. In folded configurations, this may include sections which are physically next to each other, but not directly optically linked. For example, as shown in FIG. 3, which shows a modulator which is optically similar to that of FIG. 2, the input 307, output 308, splitter array 304, detectors 309, polarisation rotator 305 and combiner 306 may be provided on a first discrete element 311 fabricated from SiPh, the RF 301, bias 302, and phase 303 sections may be provided on a second discrete element 312 fabricated from TFLN, and the U-turn section 310 may be provided on a third discrete element 313 fabricated from SiPh.

Similarly, the components of the modulator may be divided into more discrete elements than are presented in the examples of FIGS. 1B and 2—for example, where a discrete element has two light beams passing through which do not interact, the components for each light beam may be provided on a separate discrete element.

While the above has been described in terms of a PM-QPSK modulator such as that shown in FIG. 1A, it will be appreciated that the disclosure applies equally to other modulators and modulator assemblies comprising a section which modulates light based on an RF electrical input

The invention claimed is:

1. An electro-optic modulator, comprising:
   discrete elements,
      wherein adjacent discrete elements, of the discrete elements, abut such that there are no free space optics between the adjacent discrete elements;
      wherein the discrete elements comprise a first set of discrete elements fabricated from thin film lithium niobite (TFLN) and a second set of discrete elements fabricated from silicon photonics (SiPh);
      wherein the first set of discrete elements comprises a radio frequency (RF) element configured to modulate light passing through the RF element based on an electrical RF input; and
      wherein the second set of discrete elements comprise:
         a bias element configured to adjust a bias of the electro-optic modulator based on one or more direct current (DC) electrical inputs, and
         a phase element configured to vary a phase of a light beam passing through the phase element based on a DC electrical input.

2. The electro-optic modulator according to claim 1, further comprising:
   an index matching material or an anti-reflective coating at an optical connection between a first discrete element of the first set of discrete elements and a second discrete element of the second set of discrete elements.

3. The electro-optic modulator according to claim 1, further comprising:
   a mode expander at an optical connection between a first discrete element of the first set of discrete elements and a second discrete element of the second set of discrete elements.

4. The electro-optic modulator according to claim 3, wherein the mode expander is a waveguide having a taper in one dimension.

5. The electro-optic modulator according to claim 1, further comprising:
   a grating coupling at an optical connection between a first discrete element of the first set of discrete elements and a second discrete element of the second set of discrete elements.

6. The electro-optic modulator according to claim 1, wherein the second set of discrete elements further comprise at least one of:
   a polarisation rotation element configured to rotate a polarisation of a light beam passing through the polarisation rotation element;
   a polarisation combiner element configured to receive two input light beams of differing polarisation, and combine them into a single light beam;
   a detector element configured to output an electrical signal dependent on an intensity of light passing through the element; or
   a u-turn element configured to receive one or more light beams and to change a direction of the light beams by substantially 180 degrees.

7. The electro-optic modulator according to claim 1, wherein the second set of discrete elements further comprise at least one of:
   an input element configured to receive light from an optical fibre; or
   an output element configured to provide light to an optical fibre.

8. The electro-optic modulator according to claim 7, further comprising:
   at an interface between the electro-optic modulator and the optical fibre, at least one of:
      a grating coupling;
      a mode expander; or
      tapered waveguides with end fire coupling.

9. The electro-optic modulator according to claim 1, wherein the first set of discrete elements are included in a first Mach-Zehnder (MZ) interferometer.

10. The electro-optic modulator according to claim 9, wherein the second set of discrete elements are included in a second MZ interferometer, and
    wherein outputs of the first MZ interferometer and the second MZ interferometer are combined by a polarisation combiner.

11. A method of manufacturing a modulator, the method comprising:
    providing a first set of discrete elements and second set of discrete elements, wherein the first set of discrete elements are fabricated from thin film lithium niobite (TFLN) and the second set of discrete elements are fabricated from silicon photonics (SiPh),
       the first set of discrete elements comprising a radio frequency (RF) element configured to modulate light passing through the RF element based on RF electrical input, and
       the second set of discrete elements comprising:
          a bias element configured to adjust a bias of the modulator based on one or more direct current (DC) electrical inputs, and
          a phase element configured to vary a phase of a light beam passing through the phase element based on a DC electrical input; and
    joining the first set of discrete elements and the second set of discrete elements such that there are no free space optics between adjacent discrete elements.

12. The method according to claim 11, wherein joining the first set of discrete elements and the second set of discrete elements comprise:
    applying an index matching material or an anti-reflective coating to an optical join between a discrete element of the first set of discrete elements and a discrete element of the second set of discrete elements.

13. The method according to claim 11, further comprising:
configuring a mode expander at an optical connection between a first discrete element of the first set of discrete elements and a second discrete element of the second set of discrete elements.

14. The method according to claim 13, wherein the mode expander is a waveguide having a taper in one dimension.

15. The method according to claim 11, further comprising:
configuring a grating coupling at an optical connection between a first discrete element of the first set of discrete elements and a second discrete element of the second set of discrete elements.

16. The method according to claim 11, wherein the second set of discrete elements further comprise at least one of:
a polarisation rotation element configured to rotate a polarisation of a light beam passing through the polarisation rotation element;
a polarisation combiner element configured to receive two input light beams of differing polarisation, and combine them into a single light beam;
a detector element configured to output an electrical signal dependent on an intensity of light passing through the element; or
a u-turn element configured to receive one or more light beams and to change a direction of the light beams by substantially 180 degrees.

17. The method according to claim 11, wherein the second set of discrete elements further comprise at least one of:
an input element configured to receive light from an optical fibre; or
an output element configured to provide light to an optical fibre.

18. The method according to claim 17, further comprising:
configuring, at an interface between the modulator and the optical fibre, at least one of:
a grating coupling;
a mode expander; or
tapered waveguides with end fire coupling.

19. The method according to claim 11, wherein the first set of discrete elements are included in a first Mach-Zehnder (MZ) interferometer.

20. The method according to claim 19, wherein the second set of discrete elements are included in a second MZ interferometer, and
wherein outputs of the first MZ interferometer and the second MZ interferometer are combined by a polarisation combiner.

* * * * *